(12) United States Patent
Kayashima et al.

(10) Patent No.: US 10,100,210 B2
(45) Date of Patent: Oct. 16, 2018

(54) INK, INK CARTRIDGE, INK DISCHARGE APPARATUS, INK DISCHARGE METHOD, AND CURED PRODUCT

(71) Applicant: FUJI XEROX CO., LTD., Tokyo (JP)

(72) Inventors: Hiroshi Kayashima, Kanagawa (JP); Jun Kawahara, Kanagawa (JP); Takashi Oyanagi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 27 days.

(21) Appl. No.: 14/825,548

(22) Filed: Aug. 13, 2015

(65) Prior Publication Data

US 2016/0280941 A1    Sep. 29, 2016

(30) Foreign Application Priority Data

Mar. 27, 2015   (JP) .................. 2015-066296

(51) Int. Cl.

| | |
|---|---|
| *C09D 11/101* | (2014.01) |
| *C09D 11/103* | (2014.01) |
| *C09D 11/322* | (2014.01) |
| *C09D 11/38* | (2014.01) |
| *B41J 2/01* | (2006.01) |

(52) U.S. Cl.
CPC ............. *C09D 11/101* (2013.01); *B41J 2/01* (2013.01); *C09D 11/103* (2013.01); *C09D 11/322* (2013.01); *C09D 11/38* (2013.01); *Y10T 428/31855* (2015.04)

(58) Field of Classification Search
CPC ... C09D 11/101; C09D 11/103; C09D 11/322; C09D 11/38; B41J 2/01; Y10T 428/31855
See application file for complete search history.

(56) References Cited

U.S. PATENT DOCUMENTS

| | | | | |
|---|---|---|---|---|
| 4,147,679 | A * | 4/1979 | Scriven | C08G 18/0804 |
| | | | | 204/478 |
| 5,641,346 | A * | 6/1997 | Mantell | C09D 11/36 |
| | | | | 106/31.58 |
| 6,284,032 | B2 * | 9/2001 | Andes | C09C 1/0018 |
| | | | | 106/436 |
| 6,447,877 | B1 | 9/2002 | Hegi et al. | |
| 2013/0139722 | A1* | 6/2013 | Okamoto | C09D 11/101 |
| | | | | 106/31.43 |

FOREIGN PATENT DOCUMENTS

| | | |
|---|---|---|
| JP | 2005298757 A | 10/2005 |
| WO | 9744363 A1 | 11/1997 |

* cited by examiner

*Primary Examiner* — Patrick D Niland
(74) *Attorney, Agent, or Firm* — Oliff PLC (57) ABSTRACT

An ink includes a radiation-curable compound, a liquid matter which is incompatible with the radiation-curable compound and is dispersed in a state of droplets, and a surfactant.

10 Claims, 4 Drawing Sheets

FIG. 5 ical Field

The present invention relates to an ink, an ink cartridge, an ink discharge apparatus, an ink discharge method, and a cured product.

INK, INK CARTRIDGE, INK DISCHARGE APPARATUS, INK DISCHARGE METHOD, AND CURED PRODUCT

CROSS-REFERENCE TO RELATED APPLICATIONS

This application is based on and claims priority under 35 USC 119 from Japanese Patent Application No. 2015-066296 filed Mar. 27, 2015.

BACKGROUND

Technical Field

The present invention relates to an ink, an ink cartridge, an ink discharge apparatus, an ink discharge method, and a cured product.

SUMMARY

According to an aspect of the invention, there is provided an ink, including:
a radiation-curable compound;
a liquid matter which is incompatible with the radiation-curable compound and is dispersed in a state of droplets; and
a surfactant.

BRIEF DESCRIPTION OF THE DRAWINGS

Exemplary embodiments of the present invention will be described in detail based on the following figures, wherein.

DETAILED DESCRIPTION

Hereinafter, the exemplary embodiment which is an example of the present invention will be described in detail.
Ink The ink according to the exemplary embodiment includes a radiation-curable compound, a liquid matter (hereinafter, referred to as "droplets of a liquid matter") which is incompatible with the radiation-curable compound and is dispersed in a state of droplets, and a surfactant. The droplets of a liquid matter are included in the ink in a state of being dispersed in the radiation-curable compound. In addition, the ink according to the exemplary embodiment is a material before curing of the radiation-curable compound.

By the above configuration, in the ink according to the exemplary embodiment, the dispersion stability of the droplets of the liquid matter is high, and formation of a cured product having excellent concealing properties is obtained.

The reason is considered to be as follows.

In the related art, an ink obtained by mixing a radiation-curable compound with a pigment such as titanium oxide for the purpose of forming a cured product (for example, white image) having excellent concealing properties is known. However, since the pigment such as titanium oxide has a higher specific gravity compared to the radiation-curable compound, the pigment is likely to be precipitated, and due to this, it is necessary that the cartridge accommodating the ink is shaken, or a circulation-type dedicated discharge head is used.

On the other hand, an ink including a radiation-curable compound and droplets of a liquid matter which are dispersed in the radiation-curable compound is known. After forming or when forming a cured product using this ink, by vaporizing the droplets of the liquid matter, voids are formed in a state of being dispersed in the cured product. The cured product in which voids are dispersed obtains concealing properties by light scattering (light scattering at the interface between the cured product and the gas (air) in the voids) due to the voids.

However, in the case of storing the ink for a long period of time, the dispersion stability of the droplets of the liquid matter is reduced, and the droplets of the liquid matter come into contact with each other and are combined, and thus, grow into the droplets of the liquid matter having a large diameter, in some cases. When forming a cured product by the ink in a state in which the diameters of the droplets of the liquid matter are grown, the diameters of the voids after vaporizing the droplets of the liquid matter also become large, the light scattering properties due to the voids are lowered, and the concealing properties are also lowered.

Figure 3:
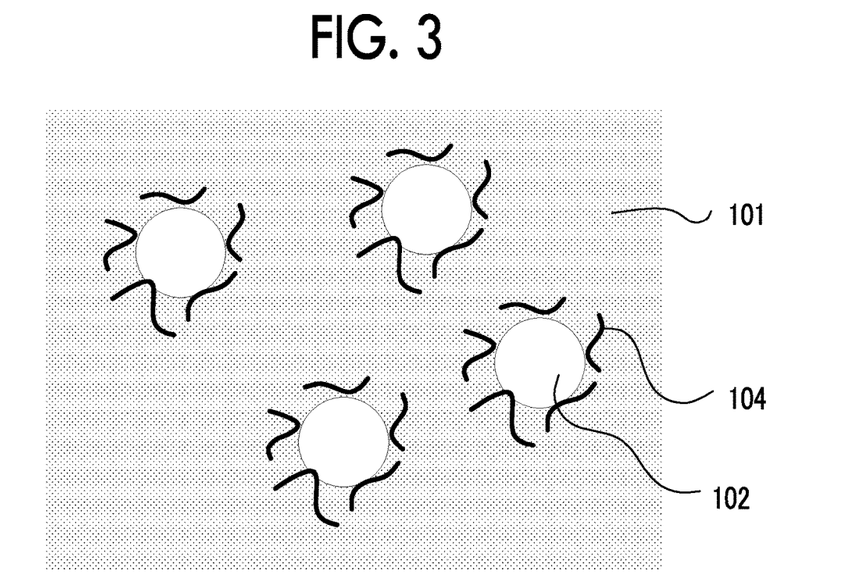
FIG. 3 is a schematic view showing an ink according to the exemplary embodiment.
Figure 4:
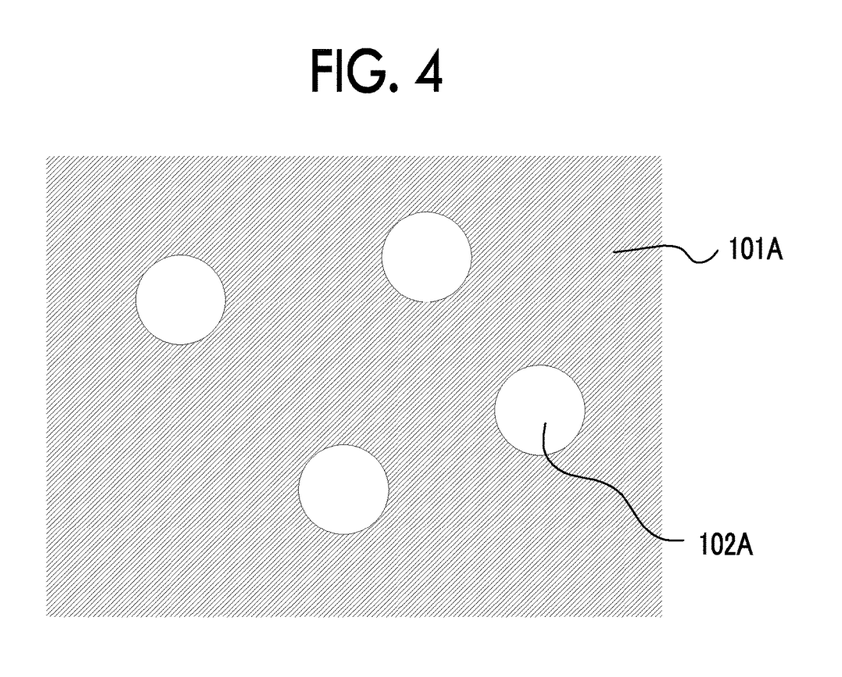
FIG. 4 is a schematic view showing a cured product of the ink according to the exemplary embodiment.

In contrast, when the ink including the radiation-curable compound and the droplets of the liquid matter which is dispersed in the radiation-curable compound further includes a surfactant, the dispersion stability of the droplets of the liquid matter is increased. The surfactant is likely to be present at the interface between the droplets of the incompatible liquid matter and the radiation-curable compound, and thus, the dispersion stability of the droplets of the liquid matter is increased (see FIG. 3). Accordingly, even in the case of storing the ink for a long period of time, growth in the diameters of the droplets of the liquid matter is prevented, and reduction in the light scattering properties of the voids of the cured product formed by the inks is also prevented (see FIG. 4).

As described above, it is considered that, in the ink according to the exemplary embodiment, the dispersion stability of the droplets of the liquid matter is high, and formation of a cured product having excellent concealing properties is obtained. In addition, in the case of not including a coloring material other than a white coloring material in the ink, the whiteness of the cured product is also increased, and thus, the ink is useful as a white ink. Since growth of the diameters of the droplets of the liquid matter is prevented, discharge failure in an ink jet method is also likely to be prevented.

The ink according to the exemplary embodiment may further include a solid particulate matter which is present in the droplets (droplets formed of the liquid matter) of the liquid matter. When the solid particulate matter is present in the droplets of the liquid matter, the solid particulate matter is also present in the voids of the cured product formed by the ink. When the solid particulate matter is present in the voids of the cured product, in addition to the interface between the cured product and the gas (air) in the voids, the interface between the gas (air) in the voids and the solid particulate matter is formed, and due to this, the light scattering properties are further increased (see FIG. 5). Therefore, when the solid particulate matter is present in the droplets of the liquid matter, the concealing properties of the cured product is further increased. Furthermore, in the case of not including a coloring material other than a white coloring material in the ink, the whiteness of the cured product is also increased, and thus, the ink is useful as a white ink.

In addition, since the droplets of the liquid matter have a low specific gravity, even in a state in which the solid particulate matter is present in the droplets, a specific gravity difference with the radiation-curable compound is small. Therefore, precipitation of the droplets of the liquid matter, that is, precipitation of the solid particulate matter is also prevented.

In FIGS. 3 to 5, 101 represents the radiation-curable compound. 101A represents the cured product of the radiation-curable compound. 102 represents the droplets of the liquid matter. 102A represents the voids. 106 represents the solid particulate matter.

Hereinafter, the ink according to the exemplary embodiment will be described in detail.

The ink according to the exemplary embodiment includes the radiation-curable compound, the droplets of the liquid matter, and a surfactant. In addition, the ink preferably also includes the solid particulate matter which is present in the droplets of the liquid matter.

In addition to these, the ink may include other additives such as a photopolymerization initiator, a polymerization inhibitor, a surfactant, or a coloring material.

Radiation-Curable Type Compound The radiation-curable compound is a compound which is cured (polymerized) with radiation (for example, ultraviolet rays and electron beam). The radiation-curable compound may be a monomer, or may be an oligomer.

As the radiation-curable compound, a compound having a radiation-curable functional group (radiation-polymerizable functional group) is exemplified. Example of the radiation-curable functional group include an ethylenic unsaturated double bond (for example, a N-vinyl group, a vinyl ether group, and a (meth)acryloyl group), an epoxy group, and an oxetanyl group. The radiation-curable compound may be a compound having an ethylenic unsaturated bonding group (preferably, (meth)acryloyl group). Specific examples of the radiation-curable compound include (meth) acrylate (monofunctional (meth)acrylate, and multifunctional (meth)acrylate).

In the specification, "(meth)acrylate" indicates both "acrylate" and "methacrylate". In addition, "(meth)acryloyl" indicates both "acryloyl group" and "methacryloyl group".

(Meth)acylate

Examples of the monofunctional (meth)acrylate include linear, branched, or cyclic alkyl (meth)acrylates, (meth)acrylates having a hydroxyl group, (meth)acrylates having a heterocycle, and (meth)acrylamide compounds.

Examples of the alkyl (meth)acrylate include methyl (meth)acrylate, ethyl (meth)acrylate, isobutyl (meth)acrylate, t-butyl (meth)acrylate, lauryl (meth)acrylate, stearyl (meth)acrylate, isostearyl (meth)acrylate, cyclohexyl (meth) acrylate, 4-t-cyclohexyl (meth)acrylate, isobornyl (meth) acrylate, and dicyclopentanyl (meth) acrylate.

Examples of the (meth)acrylate having a hydroxyl group include hydroxyethyl (meth)acrylate, hydroxypropyl (meth) acrylate, 4-hydroxybutyl (meth)acrylate, polyethylene glycol mono(meth)acrylate, methoxypolyethylene glycol mono (meth)acrylate, polypropylene glycol mono(meth)acrylate, methoxypolypropylene glycol mono(meth)acrylate, and mono(meth)acrylate of a block polymer of polyethylene glycol-polypropylene glycol.

Examples of the (meth)acrylate having a heterocycle include tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, and adamantyl (meth)acrylate.

Examples of the (meth)acrylamide compound include (meth)acrylamide, N-methyl (meth)acrylamide, N-ethyl (meth)acrylamide, N-propyl (meth)acrylamide, N-butyl (meth)acrylamide, N,N'-dimethyl (meth)acrylamide, N,N'-diethyl (meth)acrylamide, N-hydroxyethyl (meth)acrylamide, N-hydroxypropyl (meth)acrylamide, and N-hydroxybutyl (meth)acrylamide.

Among the multifunctional (meth)acrylates, examples of bifunctional (meth)acrylates include 1,10-decanediol di(meth)acrylate, 2-methyl-1,8-octanediol di(meth)acrylate, 2-butyl-2-ethyl-1,3-propanediol di(meth)acrylate, 1,9-monandiol di(meth)acrylate, 1,8-octanediol di(meth)acrylate, 1,7-heptanediol di(meth)acrylate, polytetramethylene glycol di(meth)acrylate, 3-methyl-1,5-pentanediol di(meth)acrylate, 1,6-hexanediol di(meth)acrylate, neopentyl glycol di(meth)acrylate, hydroxypivalic acid neopentyl glycol di(meth)acrylate, tripropylene glycol di(meth)acrylate, 1,4-butanediol di(meth)acrylate, dipropylene glycol diacrylate, 2-(2-vinyloxyethoxy)ethyl (meth)acrylate, EO (ethylene oxide)-modified bisphenol A di(meth)acrylate, PO (propylene oxide)-modified bisphenol A di(meth)acrylate, EO-modified hydrogenated bisphenol A di(meth)acrylate, and EO (ethylene oxide)-modified bisphenol F di(meth) acrylate.

Among the multifunctional (meth)acrylates, examples of the tri- or higher multifunctional (meth)acrylates include trimethylolpropane triacrylate, ethoxylated trimethylolpropane triacrylate, propoxylated trimethylolpropane triacrylate, pentaerythritol triacrylate, ethoxylated glycerin triacrylate, tetramethylolmethane triacrylate, pentaerythritol tetraacrylate, ethoxylated pentaerythritol tetraacrylate, EO (ethylene oxide)-modified diglycerin tetraacrylate, ditrimethylolpropane tetraacrylate modified acrylate, dipentaerythritol pentaacrylate, and dipentaerythritol hexaacrylate.

Examples of the radiation-curable compound also include urethane (meth)acrylate, epoxy (meth)acrylate, and polyester (meth)acrylate. Among these, urethane (meth)acrylate is preferable as the radiation-curable compound.

Urethane (meth)acylate

The urethane (meth)acrylate may be a compound having an urethane structure and one or more (preferably two) (meth)acryloyl groups in one molecule. Although the urethane (meth)acrylate may be a monomer or an oligomer, the urethane (meth)acrylate is preferably an oligomer.

The number of the functional group (the number of (meth)acryloyl groups) of urethane (meth)acrylate is preferably from 2 to 20 (more preferably, from 2 to 15).

Examples of the urethane (meth)acrylate include reaction products obtained by using a polyisocyanate compound, a polyol compound, and a hydroxyl group-containing (meth) acrylate. Specific examples of the urethane (meth)acrylate include reaction products of a prepolymer which is obtained by a reaction of a polyisocyanate compound and a polyol compound and has an isocyanate group at a terminal and a hydroxyl group-containing (meth)acrylate. In addition, examples of the urethane (meth)acrylate include reaction products of a polyisocyanate compound and a hydroxyl group-containing (meth)acrylate.

Polyisocyanate Compound

Examples of the polyisocyanate compound include linear saturated hydrocarbon isocyanates, cyclic saturated hydrocarbon isocyanates, and aromatic polyisocyanates. Among these, as the polyisocyanate compound, linear saturated hydrocarbon isocyanates which do not have a photoabsorption band in a near ultraviolet region and cyclic saturated hydrocarbon isocyanates which do not have a photoabsorption band in a near ultraviolet region are preferable.

Examples of the linear saturated hydrocarbon isocyanate include tetramethylene diisocyanate, hexamethylene diisocyanate, 2,2,4-trimethyl hexamethylene diisocyanate, and 2,4,4-trimethyl hexamethylene diisocyanate.

Examples of the cyclic saturated hydrocarbon isocyanate include isophorone diisocyanate, norbornane diisocyanate, dicyclohexylmethane diisocyanate, methylene bis(4-cyclohexyl isocyanate), hydrogenated diphenylmethane diisocyanate, hydrogenated xylene diisocyanate, and hydrogenated toluene diisocyanate.

Examples of the aromatic polyisocyanate include 2,4-tolylene diisocyanate, 1,3-xylylene diisocyanate, p-phenylene diisocyanate, 3,3'-dimethyl-4,4'-diisocyanate, 6-isopropyl-1,3-phenyl diisocyanate, and 1,5-naphthalene diisocyanate.

Polyol Compound

Examples of the polyol compound include diols and polyols.

Examples of the diol include alkylene glycols (for example, ethylene glycol, 1,2-propanediol, 1,3-propanediol, 2-methyl-1,3-propanediol, 1,3-butanediol, 1,4-butanediol, 1,5-pentanediol, 2-methyl-1,5-pentanediol, neopentyl glycol, 3-methyl-1,5-pentanediol, 2,3,5-trimethyl-1,5-pentanediol, 1,6-hexane diol, 2-ethyl-1,6-hexanediol, 2,2,4-trimethyl-1,6-hexanediol, 1,8-octanediol, 1,9-nonanediol, 1,10-decanediol, 1,12-dodecane diol, 1,14-tetradecane diol, 1,16-hexadecanediol, 1,2-dimethylol cyclohexane, 1,3-dimethylol cyclohexane, and 1,4-dimethylol cyclohexane).

Examples of the polyol include alkylene polyols containing three or more hydroxyl groups (for example, glycerin, trimethylolethane, trimethylolpropane, 1,2,6-hexanetriol, 1,2,4-butanetriol, erythritol, sorbitol, pentaerythritol, dipentaerythritol, and mannitol).

Examples of the polyol compound also include polyether polyol, polyester polyol, and polycarbonate polyol.

Examples of the polyether polyol include multimers of polyols, adducts of polyols with alkylene oxides, and ring-opened polymers of alkylene oxides.

Examples of the polyol include ethylene glycol, diethylene glycol, propylene glycol, dipropylene glycol, 1,4-butanediol, 1,3-butanediol, neopentyl glycol, 1,6-hexanediol, 1,2-hexanediol, 3-methyl-1,5-pentanediol, 2-butyl-2-ethyl-1,3-propanediol, 2,4-diethyl-1,5-pentanediol, 1,8-octanediol, 1,9-nonanediol, 2-methyl-1,8-octanediol, 1,8-decanediol, octadecanediol, glycerin, trimethylolpropane, pentaerythritol, and hexanetriol.

Examples of the alkylene oxide include ethylene oxide, propylene oxide, butylene oxide, styrene oxide, epichlorohydrin, and tetrahydrofuran.

Examples of the polyester polyol include reaction products of polyols with dibasic acids and ring-opened polymers of cyclic ester compounds.

Examples of the polyol include polyols exemplified in the description of the polyether polyols.

Examples of the dibasic acid include carboxylic acids (for example, succinic acid, adipic acid, sebacic acid, dimer acid, maleic acid, phthalic acid, isophthalic acid, and terephthalic acid) and anhydrides of the carboxylic acids.

Examples of the cyclic ester compound include ε-caprolactone and β-methyl-δ-valerolactone.

Examples of the polycarbonate polyol include reaction products of glycols with alkylene carbonates, reaction products of glycols with diaryl carbonates, and reaction products of a glycols with dialkyl carbonates.

Examples of the alkylene carbonate include ethylene carbonate, 1,2-propylene carbonate, and 1,2-butylene carbonate. Examples of the diaryl carbonate include diphenyl carbonate, 4-methyl diphenyl carbonate, 4-ethyl diphenyl carbonate, 4-propyl diphenyl carbonate, 4,4'-dimethyl diphenyl carbonate, 2-tolyl-4-tolyl carbonate, 4,4'-diethyl diphenyl carbonate, 4,4'-propyl diphenyl carbonate, phenyl toluyl carbonate, bischlorophenyl carbonate, phenyl chlorophenyl carbonate, phenyl naphthyl carbonate, and dinaphthyl carbonate.

Examples of the dialkyl carbonate include dimethyl carbonate, diethyl carbonate, di-n-propyl carbonate, diisopropyl carbonate, di-n-butyl carbonate, diisobutyl carbonate, di-t-butyl carbonate, di-n-amyl carbonate, and diisoamyl carbonate.

Hydroxyl Group-Containing (Meth)acrylate

Examples of the Hydroxyl group-containing (meth)acrylate include 2-hydroxyethyl (meth)acrylate, 2-hydroxypropyl (meth)acrylate, 2-hydroxybutyl (meth)acrylate, 2-hydroxy-3-phenoxypropyl (meth)acrylate, glycerin di(meth)acrylate, trimethylolpropane di(meth)acrylate, pentaerythritol tri(meth)acrylate, and dipentaerythritol penta (meth)acrylate. Examples of the Hydroxyl group-containing (meth)acrylate also include adducts of (meth)acrylic acids with glycidyl group-containing compounds (for example, alkyl glycidyl ether, allyl glycidyl ether, and glycidyl (meth)acrylate).

The weight average molecular weight of the urethane (meth)acrylate is preferably from 500 to 5,000, and more preferably from 1,000 to 3,000.

The weight average molecular weight of the urethane (meth)acrylate is a value measured by gel permeation chromatography (GPC) using polystyrene as a standard substance.

These radiation-curable compounds may be used alone or in combination of two or more kinds thereof.

Droplets of Liquid Matter

The droplets of the liquid matter are formed of a liquid matter which is incompatible with the radiation-curable compound. That is, the droplets of the liquid matter are in a state in which the liquid matter is emulsified in the radiation-curable compound as a matrix.

Here, "incompatible" represents a state in which liquids are present in each separate phase without being mixed with each other at 25° C. Specifically, "incompatible" represents that, when 40% by weight of a liquid matter with respect to the radiation-curable compound is added dropwise to the radiation-curable compound, and the resultant product is stirred for 10 minutes and allowed to stand for 24 hours, phase separation or white turbidity occurs.

Examples of the liquid matter include various volatile solvents. In particular, as the liquid matter, a solvent having a melting temperature from 30° C. to 150° C. (preferably, from 60° C. to 120° C.) is preferable.

Specific examples of the liquid matter include water, alcohol solvents, ketone solvents, ether solvents, ester solvents, and hydrocarbon solvents.

Examples of the water include distilled water, ion exchange water, ultrafiltration water, and pure water.

The alcohol solvent is a solvent having an alcoholic hydroxyl group in one molecule. Examples of the water-soluble alcohol solvent include methanol, ethanol, 1-propanol, 2-propanol, tert-butyl alcohol, ethylene glycol, monoalkyl ethers of ethylene glycol, propylene glycol, monoalkyl ethers of propylene glycol, diethylene glycol, monoalkyl ethers of diethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol.

The ketone solvent is a solvent having a ketone group in one molecule. Examples of the water-soluble ketone solvent include acetone, methyl ethyl ketone, and cyclohexanone.

The ether solvent is a water-soluble solvent having an ether bond in one molecule. Examples of the water-soluble ether solvent include tetrahydrofuran (THF), dioxane, trioxane, 1,2-dimethoxyethane, diethylene glycol dimethyl ether, and diethylene glycol diethyl ether.

The ester solvent is a solvent having an ester bond in one molecule. Examples thereof include methyl acetate, ethyl acetate, γ-butyrolactone, γ-valerolactone, n-propyl acetate, i-propyl acetate, and n-butyl acetate.

Among these, as the liquid matter, water, methanol, and ethanol are preferable from the viewpoint of improving the dispersion stability of the droplets of the liquid matter and the concealing properties of the cured product.

The volume average particle diameter (hereinafter, also referred to as "D50v") of the droplets of the liquid matter is preferably from 0.1 μm to 1 μm, and more preferably from 0.15 μm to 0.5 μm from the viewpoint of improving the dispersion stability of the droplets of the liquid matter and the concealing properties of the cured product.

The volume average particle diameter of the droplets of the liquid matter is measured by using a particle size analyzer from diluted to concentrated system FPAR-1000 (manufactured by Otsuka Electronics Co., Ltd.). The measurement is performed by putting a 10-fold diluted ink with the radiation-curable compound in a measuring cell. In the measurement, the viscosity and the refractive index of the radiation-curable material are adopted as input values.

The liquid matter may be used alone or in combination of two or more kinds thereof.

Surfactant

Examples of the surfactant include anionic surfactants, cationic surfactants, amphoteric surfactants, and nonionic surfactants.

Examples of the anionic surfactant include carboxylates, sulfuric ester salts, sulfonates, and phosphoric ester salts. Specifically, alkyl benzene sulfonates, alkylphenyl sulfonates, alkyl naphthalene sulfonates, higher fatty acid salts, sulfuric acid ester salts of higher fatty acid esters, sulfonates of higher fatty acid esters, sulfuric acid ester salts and sulfonates of higher alcohol ethers, higher alkyl sulfosuccinates, higher alkyl phosphoric acid ester salts, phosphoric acid ester salts of higher alcohol ethylene oxide adducts may be used, and, for example, dialkyl sulfosuccinates, alkyl sulfates, dodecyl benzene sulfonates, allylbenzene sulfonates, isopropyl naphthalene sulfonates, monobutyl phenylphenol monosulfonates, monobutyl biphenyl sulfonates, monobutyl biphenyl sulfonates, and dibutyl phenylphenol disulfonates are also effectively used.

Examples of the cationic surfactant include tetraalkyl ammonium salts, alkylamine salts, benzalconium salts, alkylpyridium salts, and imidazolium salts, and specific examples thereof include dihydroxyethyl stearylamine, 2-heptadecenyl-hydroxyethyl imidazoline, lauryl dimethylbenzyl ammonium chloride, cetylpyridinium chloride, and stearamide methylpyridium chloride.

Examples of the amphoteric surfactant include carboxylate-type surfactants such as amino acid-type surfactants and betaine-type surfactants, sulfuric acid ester-type surfactants, sulfonic acid-type surfactants, and phosphoric acid ester-type surfactants. In addition, as the amphoteric surfactant, alanine-type surfactants, amidopropyl betaine-type surfactants, sulfobetaine-type surfactants, amidoamine oxide-type surfactants, and imidazoline-type surfactants are present, and specifically, alkyl betaines, sulfobetaines, sulfate betaines, imidazolidone betaines, amidopropyl betaines, and amino dipropionates are used.

Examples of the nonionic surfactant include polyethylene glycol-type surfactants and polyol-surfactants. Examples of the polyethylene glycol-type surfactant include higher alcohol alkylene oxide adducts, alkylphenol alkylene oxide adducts, fatty acid alkylene oxide adducts, polyol fatty acid ester alkylene oxide adducts, fatty acid amide alkylene oxide adducts, and polyalkylene glycol alkylene oxide adducts. In addition, examples of the polyol-surfactant include glycerol fatty acid esters, polyol alkyl ethers, and alkanolamine fatty acid amides.

Examples of the nonionic surfactant also include polypropylene glycol ethylene oxide adducts, polyoxyethylene nonylphenyl ether, polyoxyethylene octylphenyl ether, polyoxyethylene docecyl phenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, aliphatic alkanol amides, glycerol esters, and sorbitan esters.

Examples of other surfactants include silicone surfactants such as polysiloxaneoxyethylene adducts; fluorine surfactants such as perfluoroalkyl carboxylates, perfluoroalkyl sulfonates, and oxyethylene perfluoroalkyl ethers; and biosurfactants such as spiculisporic acid, rhamnolipid, and lysolecithin.

As the surfactant, a polymer dispersant for dispersing a coloring material such as a pigment is also exemplified.

Examples of the polymer dispersant include a polymer having an acidic group or a basic group as a functional group and a salt of the polymer.

Examples of the polymer dispersant include polymers having at least one of a polyester chain, a polyacrylic chain, a polyurethane chain, a polyamine chain, a polycaprolactone chain, or a polyester polyamine chain, as a main chain, and an acidic group (a carboxyl group, a sulfonic group, or a hydroxyl group) or a salt thereof, or a basic group (amino group) or a salt thereof, as a side chain.

Specific examples of the polymer dispersant include polymers or copolymers described in 1) to 7) below.

1) Acidic group-containing polymers obtained by polymerizing a monomer having an acidic group or a salt thereof (for example, polyacrylic acid or a salt thereof, polyvinyl sulfate or a salt thereof, polybenzene sulfonic acid or a salt thereof, condensed naphthalene sulfonic acid or a salt thereof, a cellulose derivative, or a starch derivative).

2) Basic group-containing polymers obtained by polymerizing a monomer having a basic group or a salt thereof (for example, polymers having a quaternary ammonium group or a salt thereof such as poly(methacryloxyalkyl ammonium) or a salt thereof, poly(methacryloxyaryl ammonium) or a salt thereof, poly(acryloxyalkyl ammonium) or a salt thereof, poly(acryloxyaryl ammonium) or a salt thereof, poly(diallyl ammonium) or a salt thereof, polystyryl methylene imidazoliums or salts thereof, or polystyryl methylene pyridiniums or salts thereof; and natural polymers such as alginic acid or salts thereof, gelatin, albumin, casein, gum arabic, tragacanth rubber, and lignin sulfonate).

3) Polymers obtained by polymerizing a monomer having a nonionic group (for example, polyvinylpyrrolidone, polyvinyl alcohol, polyvinyl methyl ether, polyethylene glycol, polypropylene glycol, polyacrylamide, polydimethyl amino propyl acrylamide, a vinyl alcohol-vinyl acetate copolymer, a polyvinyl alcohol-partially formalized product, a polyvinyl alcohol-partially butyralized product, a vinyl pyrrolidone-vinyl acetate copolymer, vinyl pyrrolidone-dimethyl aminopropyl acrylamide, a vinyl pyrrolidone-vinyl pyridine copolymer, a vinyl pyrrolidone-vinyl imidazole copolymer, a polyethylene oxide/propylene oxide block copolymer, and a polyethylene oxide/propylene oxide random copolymer).

4) Copolymers obtained by polymerizing a monomer having an acidic group or a salt thereof used in an acidic group-containing polymer and a monomer having a nonionic group.

5) Copolymers obtained by polymerizing a monomer having a basic group or a salt thereof used in a basic group-containing polymer and a monomer having a nonionic group.

6) Copolymers obtained by polymerizing a monomer having an acidic group or a salt thereof used in an acidic group-containing polymer and a monomer having a basic group or a salt thereof used in a basic group-containing polymer.

7) Copolymers obtained by polymerizing a monomer having an acidic group or a salt thereof used in an acidic group-containing polymer, a monomer having a basic group or a salt thereof used in a basic group-containing polymer, and a nonionic monomer.

The surfactants may be used alone or in combination of two or more kinds thereof.

Solid Particulate Matter

Examples of the solid particulate matter include inorganic particles, organic particles, and inorganic-organic composite particles.

Examples of the inorganic particles include particles of white pigments such as titanium dioxide, zirconium oxide, calcium carbonate, barium sulfate, silicon oxide, magnesium oxide, aluminum oxide, tin oxide, kaolin, and talc.

Examples of the organic particles include white particles such as polystyrene particles, benzoguanamine particles, melamine particles, acryl particles, benzoguanamine-formaldehyde condensation resin particles, benzoguanamine-melamine-formaldehyde condensation resin particles, melamine-formaldehyde condensation resin particles, polymethyl methacrylate crosslinked product resin particles, styrene-acrylic crosslinked product resin particles, and polymethyl methacrylate crosslinked product resin particles.

Examples of the organic particles also include white particles such as alkylene bismelamine derivatives (for example, ethylene bismelamine, N,N'-dicyclohexyl ethylene bismelamine, N,N'-dimethyl ethylene bismelamine, and propylene bismelamine) and bisstilbene sulfonic acid derivative-quaternary ammonium compound composite salts.

Examples of the inorganic-organic composite particles include silicone rubber particles and silicone resin particles.

Among these, as the solid particulate matter, titanium oxide particles, zirconium oxide particles, melamine-formaldehyde condensation resin particles are preferable, and titanium oxide particles are more preferable from the viewpoint of improving the dispersion stability of the droplets of the liquid matter and the concealing properties of the cured product.

The volume average particle diameter (hereinafter, also referred to as "D50v") of the solid particulate matter is preferably from 0.05 µm to 0.5 µm, and more preferably from 0.1 µm to 0.3 µm from the viewpoint of improving the dispersion stability of the droplets of the liquid matter and the concealing properties of the cured product.

The volume average particle diameter of the solid particulate matter is measured by using a particle size analyzer from diluted to concentrated system FPAR-1000 (manufactured by Otsuka Electronics Co., Ltd.). The measurement is performed by putting a 10-fold diluted ink with the radiation-curable compound in a measuring cell. In the measurement, the viscosity and the refractive index of the radiation-curable material are adopted as input values.

The solid particulate matter may be used alone or in combination of two or more kinds thereof.

Here, confirmation that the solid particulate matter is present in the droplets of the liquid matter is performed, for example, by observing using an optical microscope (digital microscope KH-7700 manufactured by HIROX Co., Ltd. is used) in a state of an ink and by determining whether the ink is turned white or not as compared to the ink not including the solid particles (ink of only the droplets of the liquid matter). That is, when the ink becomes whiter, it may be determined that the solid particulate matter is present in the droplets of the liquid matter.

Radiation Polymerization Initiator

Examples of the radiation polymerization initiator include known polymerization initiators such as a radiation radical-polymerization initiator and a radiation cationic polymerization initiator.

Examples of the radiation radical-polymerization initiator include aromatic ketones, an acylphosphine oxide compound, an aromatic onium salt compound, an organic peroxide, a thio compound (a thioxanthone compound, a thiophenyl group-containing compound, or the like), a hexaarylbiimidazole compound, a ketoxime ester compound, a borate compound, an azinium compound, a metallocene compound, an active ester compound, a compound having a carbon-halogen bond, and an alkyl amine compound.

Specific examples of the radiation radical-polymerization initiator include known radiation polymerization initiators such as acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro-benzophenone, 4,4'-dimethoxy benzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropyl thioxanthone, 2-chlorothioxanthone, 2-methyl-1-[4-(methylthio)phenyl]-2-morpholino-propan-1-one, bis(2,4,6-trimethylbenzoyl)-phenyl phosphine oxide, 2,4,6-trimethyl benzoyl-diphenyl-phosphine oxide, 2,4-diethyl thioxanthone, and bis-(2,6-dimethoxybenzoyl)-2,4,4-trimethyl pentyl phosphine oxide.

Examples of the radiation cationic polymerization initiator also include 4-benzoyl-4'-methyl diphenyl sulfide and 1-[4-(4-benzoylphenylsulfanyl)phenyl]-2-methyl-2-(4-methyl-phenylsulfonyl)propan-1-one.

The radiation polymerization initiators may be used alone or in combination of two or more kinds thereof.

Polymerization Inhibitor

Examples of the polymerization inhibitor include known polymerization inhibitors such as phenol polymerization inhibitors (for example, p-methoxyphenol, cresol, t-butyl catechol, 3,5-di-t-butyl-4-hydroxytoluene, 2,2'-methylene bis(4-methyl-6-t-butylphenol), 2,2'-methylene bis(4-ethyl-6-butylphenol), and 4,4'-thiobis(3-methyl-6-t-butylphenol)), hindered amines, hydroquinone monomethyl ethers (MEHQ), and hydroquinones.

The polymerization inhibitors may be used alone or in combination of two or more kinds thereof.

Other Additives

Examples of other additives include known additives such as a coloring material, a solvent, a sensitizer, a fixing agent, a fungicide, a preservative, an antioxidant, an ultraviolet absorbent, a chelating agent, a thickener, a dispersant, a polymerization accelerator, a penetration enhancer, and a wetting agent (humectant).

Content of Each Component

Content of Radiation-Curable Type Compound

The content of the radiation-curable compound is preferably from 50% by weight to 99% by weight, more preferably from 60% by weight to 95% by weight, and still more preferably from 70% by weight to 90% by weight, with respect to the total weight of the ink from the viewpoint of improving the dispersion stability of the droplets of the liquid matter and the concealing properties of the cured product.

Content of Liquid Matter

The content of the liquid matter (the droplets of the entirety of liquid matter) is preferably from 1% by weight to 50% by weight, more preferably from 5% by weight to 40% by weight, and still more preferably from 10% by weight to 30% by weight, with respect to the total weight of the ink from the viewpoint of improving the dispersion stability of the droplets of the liquid matter and the concealing properties of the cured product.

Content of Surfactant

The content of the surfactant is preferably from 0.1% by weight to 50% by weight, more preferably from 1% by weight to 50% by weight, still more preferably from 3% by weight to 30% by weight, and particularly preferably from 5% by weight to 20% by weight, with respect to the total weight of the ink from the viewpoint of improving the dispersion stability of the droplets of the liquid matter and the concealing properties of the cured product.

Content of Solid Particulate Matter

The content of the solid particulate matter is preferably from 0% by weight to 70% by weight, more preferably from 1% by weight to 70% by weight, still more preferably from 20% by weight to 60% by weight, and particularly preferably from 30% by weight to 50% by weight, with respect to the total weight of the ink from the viewpoint of improving the dispersion stability of the droplets of the liquid matter and the concealing properties of the cured product.

Content of Radiation Polymerization Initiator

The content of the radiation polymerization initiator is, for example, preferably from 1% by weight to 10% by weight, and more preferably from 3% by weight to 5% by weight, with respect to the total weight of the ink.

Content of Polymerization Inhibitor

The content of the polymerization inhibitor is, for example, preferably from 0.1% by weight to 1% by weight, and more preferably from 0.3% by weight to 0.5% by weight, with respect to the total weight of the ink.

Characteristics of Ink

The surface tension of the ink according to the exemplary embodiment is, for example, in a range from 20 mN/m to 40 mN/m.

Here, the surface tension is a value measured in the environment of 23° C. and 55% RH using a Wilhelmy-type tensiometer (manufactured by Kyowa Interface Science Co., Ltd.).

The viscosity of the ink according to the exemplary embodiment is, for example, in a range from 5 mPa·s to 50 mPa·s.

Here, the viscosity is a value measured under the conditions of a measurement temperature of 23° C. and a shear velocity of 1400 $s^{-1}$ using Rheomat 115 (manufactured by Contraves) as a measuring apparatus.

Ink Discharge Apparatus/Ink Discharge Method

The ink discharge apparatus according to the exemplary embodiment is provided with a discharge unit which accommodates the ink according to the exemplary embodiment and discharges the ink, and a radiation irradiation unit which irradiates the discharged ink with radiation so as to be cured.

In the ink discharge apparatus according to the exemplary embodiment, an ink discharge method in which the ink according to the exemplary embodiment is discharged, and the discharged ink is cured by radiation irradiation is realized.

The ink discharge apparatus according to the exemplary embodiment may be provided with an ink cartridge which accommodates the ink according to the exemplary embodiment and is configured to be detachable from the apparatus.

Hereinafter, the ink discharge apparatus according to the exemplary embodiment will be described with reference to the accompanying drawings. Moreover, as one example of the ink discharge apparatus, a recording apparatus of an aspect in which the ink according to the exemplary embodiment described above is applied as a white ink will be described.

Figure 1:
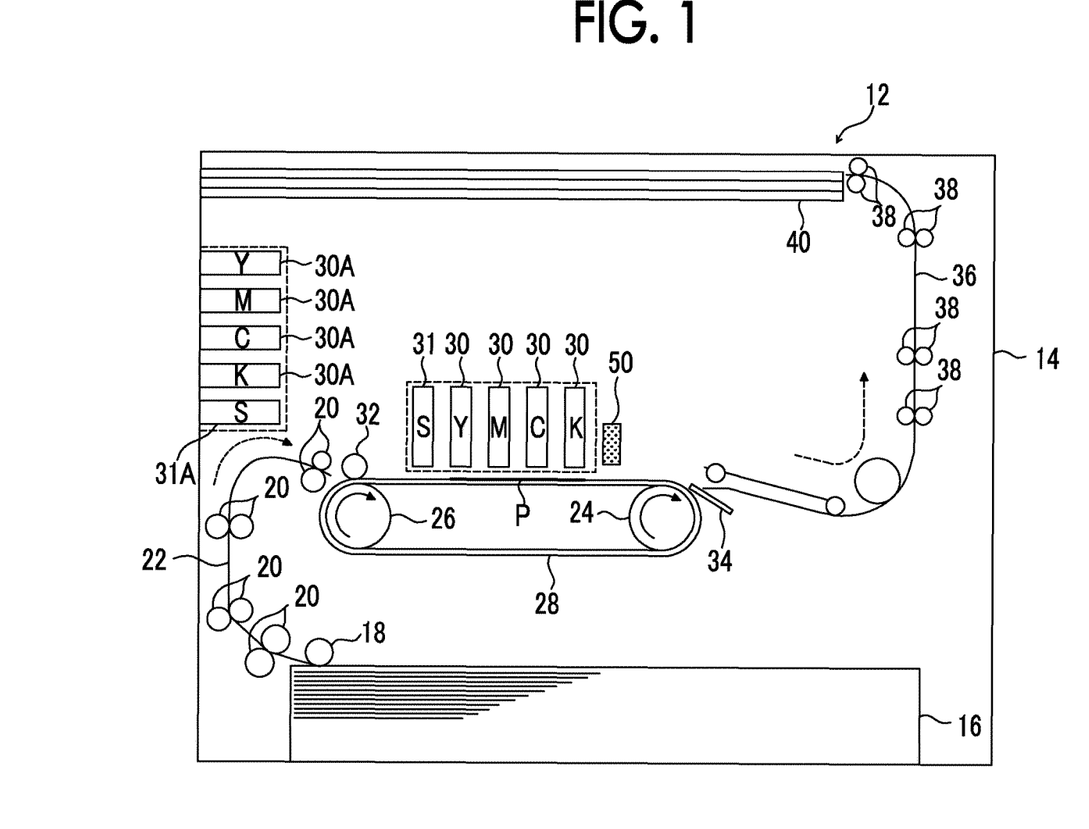
FIG. 1 is a schematic configuration diagram showing an example of a recording apparatus (one example of an ink discharge apparatus) according to the exemplary embodiment.
Figure 2:
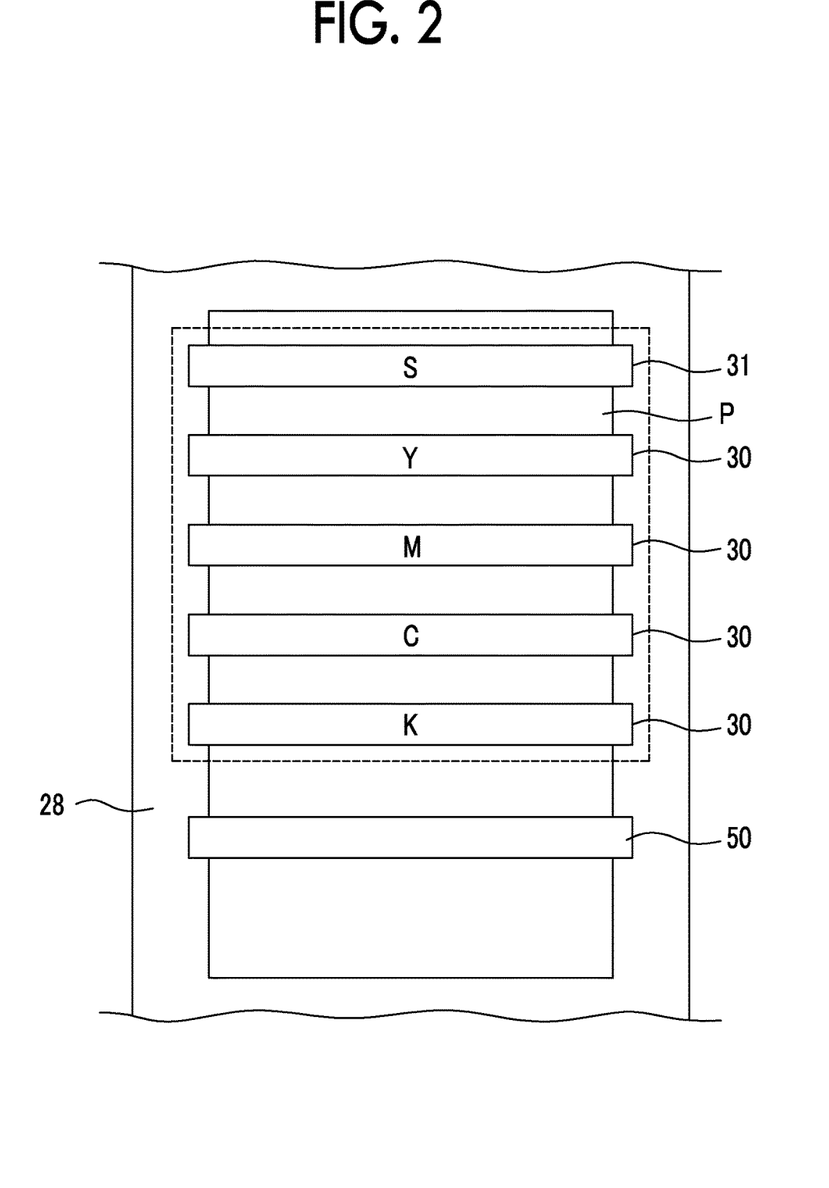
FIG. 2 is a partial plan view showing the periphery of a discharge apparatus in the recording apparatus (one example of an ink discharge apparatus) according to the exemplary embodiment.

FIG. 1 is a schematic configuration diagram showing an example of the recording apparatus (one example of the ink discharge apparatus) according to the exemplary embodiment. FIG. 2 is a partial plan view showing the periphery of the recording head in the recording apparatus according to the exemplary embodiment.

The recording according to the exemplary embodiment (one example of an ink discharge apparatus), for example, as shown in FIGS. 1 and 2, is provided with a paper supply container 16 at a lower portion in a housing 14, and has a mechanism of drawing-out a paper P (one example of a recording medium) stacked in the paper supply container 16 one by one using a drawing-out roll 18. The drawn-out paper P is supplied using a plurality of carrying in roller pairs 20 configuring a carrying in path 22.

Above the paper supply container 16, an endless transport belt 28 which is supported while being tensioned by a driving roll 24 and a driven roll 26 is disposed. Above the transport belt 28, recording heads 30 (one example of the discharge unit) and a recording head 31 (one example of the discharge unit) are disposed to face a flat portion of the transport belt 28. The region where the recording heads 30 face the flat portion of the transport belt 28 becomes a discharge region where droplets of the ink are discharged onto the paper P from the recording heads 30. The supplied paper P by the carrying in roller pairs 20 reaches the discharge region by being held by the transport belt 28, and becomes a state of facing the recording heads 30, and the droplets of the ink discharged from the recording heads 30 in accordance with the image information are attached to the surface of the paper P.

Here, the recording heads 30 are recording heads which discharge inks having colors (hereinafter, also referred to as "color ink") other than a white color. The discharge heads 30 of each color other than the white color are respectively connected with color ink cartridges 30A having each color which are detachable from the recording apparatus 12 through supply pipes (not shown), and the inks having each color are supplied to respective recording heads 30 from the ink cartridges 30A of each color other than a white color.

The recording head 31 is a recording head which discharges a white ink. The recording head 31 of a white color is connected with a white ink cartridge 31A through a supply pipe (not shown), and the white ink is supplied to the recording head 31 from the white ink cartridges 31A.

The recording heads 30 are, for example, as shown in FIG. 2, elongated recording heads in which an effective recording region (disposition region of nozzles for discharging an ink) is equal to or wider than the width (the length in the direction intersecting (for example, perpendicular to) the transportation direction of the paper P) of the paper P.

Moreover, the recording heads 30 are not limited thereto, and may be recording heads which are shorter than the width of the paper P, or may be recording heads which have a system (so-called carriage system) of discharging the ink while moving in the width direction of the paper P.

As the recording heads 30, a so-called thermal system of discharging droplets of the ink by heat, a so-called piezoelectric system of discharging droplets of the ink by pressure, or know systems may be used.

As the recording heads 30, for example, four recording heads corresponding to each of four colors of yellow (Y), magenta (M), cyan (C), and black (K) may be disposed in an array pattern along the transportation direction. The recording heads 30 are not limited to the above-described form of disposing the four recording heads 30 corresponding to each of the four colors, and depending on the purpose, the recording heads 30 may be a form of disposing one recording head corresponding to black (K), may be a form of disposing four or more recording heads 30 corresponding to each of four or more colors obtained by adding other intermediate colors.

On the upstream side of the recording head 30 (upstream side in the transportation direction of the paper P), the recording head 31 for discharging the white ink (S) is disposed. Before or after the color ink is discharged (in FIG. 1, before the ink is discharged), the white ink (S) is discharged.

Since the configuration of the recording head 31 is the same as that of the recording heads 30, the description will be omitted.

On the upstream side of the recording heads 30 and 31 (upstream side in the transportation direction of the paper P), a charging roll 32 is disposed. The charging roll 32 is driven while nipping the transport belt 28 and the paper P between the driven roll 26 and the charging roll 32, a potential difference is generated between the driven roll 26 and the charging roll 32, and due to the potential difference, the paper P is charged and electrostatically attracted to the transport belt 28.

On the downstream side of the recording heads 30 and 31 (downstream side in the transportation direction of the paper P), above the transport belt 28, a radiation irradiation apparatus 50 (one example of the radiation irradiation unit) is disposed.

The radiation irradiation apparatus 50 irradiates the ink attached to the paper P on the transport belt 28 with radiation.

The radiation irradiation apparatus 50 is, for example, as shown in FIG. 2, an elongated radiation irradiation apparatus in which an effective radiation irradiation region (disposition region of a light source for emitting radiation) is equal to or wider than the width (the direction intersecting (for example, perpendicular to) the transportation direction of the paper P) of the recording region by the recording heads 30 and 31.

Moreover, the radiation irradiation apparatus 50 is not limited thereto, and may be a radiation irradiation apparatus which is shorter than the width of the recording region by the recording heads 30, or may be a radiation irradiation apparatus which has a system (so-called carriage system) of emitting radiation while moving in the width direction of the recording region by the recording heads 30.

The radiation irradiation apparatus 50 is selected in accordance with the type of the ink. Examples of the radiation irradiation apparatus 50 include an ultraviolet ray irradiation apparatus and an electron beam irradiation apparatus.

Here, as the radiation irradiation apparatus, for example, an apparatus having a light source such as a metal halide lamp, a high pressure mercury lamp, an ultra-high pressure mercury lamp, a deep ultraviolet ray lamp, a lamp which excites mercury without an electrode from the outside by using a microwave, an ultraviolet ray laser, a xenon lamp, or an ultraviolet ray emitting diode (UV-LED) is applied.

Examples of the electron beam irradiation apparatus include electron irradiation apparatuses such as a scanning type electron irradiation apparatus, a curtain type electron irradiation apparatus, and a plasma discharge type electron irradiation apparatus.

On the downstream side of the radiation irradiation apparatus 50 (downstream side in the transportation direction of the paper P), a peeling plate 34 is disposed, and by this, the paper P is peeled from the transport belt 28. The peeled paper P is transported by a plurality of discharge roller pairs 38 configuring a discharge path 36 on the downstream side (downstream side in the transportation direction of the paper P) of the peeling plate 34, and discharged to a paper discharge container 40 provided on the upper portion of the housing 14.

Next, the operation of the recording apparatus 12 according to the exemplary embodiment will be described.

In the recording apparatus 12 according to the exemplary embodiment, the paper P is drawn-out one by one from the paper supply container 16 by the drawing-out roll 18, and transported to the transport belt 28 through the carrying in path 22.

Next, the paper P is electrostatically attracted to the transport belt 28 by the charging roll 32, and transported downward to the recording heads 30 and 31 by rotation of the transport belt 28.

Next, inks of respective colors are discharged by the recording heads 30 and 31, and as a result, a target image is recorded on the paper P.

Next, a curing reaction (polymerization reaction) of the radiation-curable compound in the ink proceeds by irradiating the ink attached to the paper P with radiation by the radiation irradiation apparatus 50, and due to this, the ink (image by the ink) is cured and fixed on the paper P.

Next, the paper P on which the ink (image by the ink) is fixed (formed) is discharged to the paper discharge container 40 through the discharge path 36.

In this manner, in the recording apparatus 12 according to the exemplary embodiment, the paper P on which the ink (image by the ink) is fixed (formed) is obtained.

Moreover, in the recording apparatus 12 according the exemplary embodiment, a method of directly discharging droplets of the ink on the surface of the paper P by the recording heads 30 and 31 is described; however, the exemplary embodiment is not limited to this, and for example, a method of discharging droplets of the ink on an intermediate transfer member and transferring the droplets of the ink on the intermediate transfer member onto the paper P may also be used.

In addition, in the recording apparatus 12 according the exemplary embodiment, a method of fixing (forming) an ink (image by an ink) on a sheet as the paper P is described; however, a method of recording an ink (image by an ink) on a roll paper as the paper P using a continuous feed machine may also be used.

In addition, in the recording apparatus 12 according the exemplary embodiment, fabric heating drying, drying by a drying drum, or a heating mechanism such as heating by laser irradiation may be provided after the ink is discharged on the paper P.

That is, the recording apparatus 12 according the exemplary embodiment is not limited to the above-described configuration, and a recording apparatus which has a known ink jet system is adopted.

It is needless to say that the exemplary embodiment is not intended to be limitedly interpreted, and is realized within the range in which the requirements of the present invention are satisfied.

Cured Product

Figure 5:
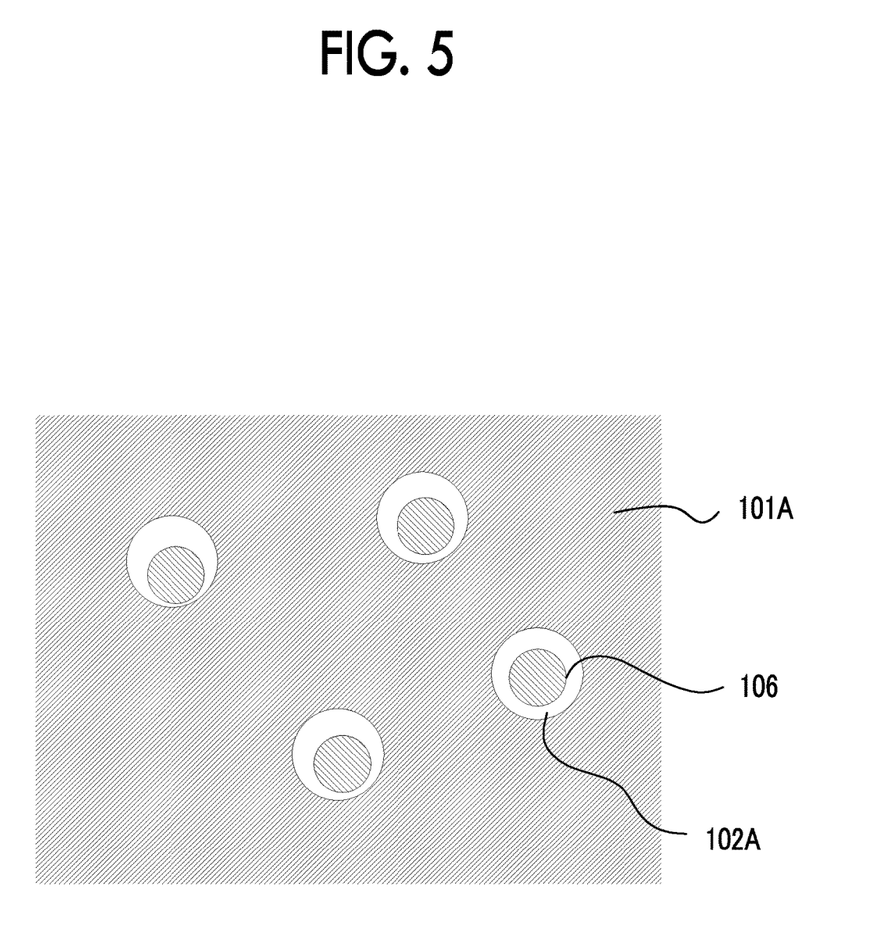
FIG. 5 is a schematic view showing a cured product of an ink according to another exemplary embodiment.

The cured product according to the exemplary embodiment is a cure product of the radiation-curable compound, and includes cavities and a solid particulate matter which is present in the cavities (see FIG. 5). Specifically, for example, the cured product according to the exemplary embodiment is the ink according to the exemplary embodiment described above, and is a cure product of the ink which further includes a solid particulate matter which is present inside the droplets (droplets formed of the liquid matter) of the liquid matter. The cured product may be a film shape, or may be a three-dimensional model.

In the cured product according to the exemplary embodiment, when the solid particulate matter is present in the voids of the cured product, in addition to the interface between the cured product and the gas (air) in the voids, the interface between the gas (air) in the voids and the solid particulate matter is formed, and due to this, the light scattering properties are increased. Thus, the concealing properties of the cured product are high. In the case of not including a coloring material other than a white coloring material in the ink, the whiteness of the cured product is also increased, and thus, the ink is useful as a white cured product.

Ink, Ink Discharge Apparatus, Ink Discharge Method, and Use of Cured Product

In the ink according to the exemplary embodiment, the dispersion stability of the droplets of the liquid matter is improved, and formation of a cured product having excellent concealing properties is obtained. In the case of not including a coloring material other than a white coloring material in the ink, formation of a cured product having high whiteness is obtained. Therefore, the ink according to the exemplary embodiment may be applied as an ink for recording a white image (use of concealing), or a model material for preparing a white (use of concealing) three-dimensional model.

In addition, an ink discharge apparatus or method using the ink according to the exemplary embodiment may be applied as an image recording apparatus or method, a three-dimensional model production apparatus or method, or the like.

Further, the cured product according to the exemplary embodiment has excellent concealing properties. In addition, in a case where the cured product does not include a coloring material other than a white coloring material, the whiteness is also excellent. Therefore, the cured product may be applied as a white (use of concealing) image, a white (use of concealing) three-dimensional model, or the like.

EXAMPLES

Hereinafter, the present invention will be described in more detail base on Examples, but, the present invention is not limited to the following Examples. Moreover, unless otherwise specifically indicated, "part(s)" means "part (s) by weight".

Example 1

2 parts by weight of a surfactant (dispersant "Solsperse 71000 (manufactured by Lubrizol Corp.)) and 20 parts by weight of ion exchange water as a liquid matter are added to 75 parts by weight of an ultraviolet ray-curable monomer "VEER-AI (manufactured by Nippon Shokubai Co., Ltd.), 2-(2-(vinyloxyethoxy)ethyl acrylate) as a radiation-curable compound, and the resultant product is dispersed for 0.5 hours using a homogenizer. Then, 3 parts by weight of a photopolymerization initiator Irgacure 819 is dissolved in the obtained dispersion, whereby an ink is prepared.

Moreover, when observing the ink, it is confirmed that the droplets of the liquid matter (water) are dispersed in the ink.

Example 2

40 parts by weight of melamine-formaldehyde condensation resin particles "product name: Epostar S (manufactured by Nippon Shokubai Co., Ltd.), D50v=0.2 μm" as a solid particulate matter, 4 parts by weight of a surfactant (dispersant "trade name: Phosphanol RS-610 (manufactured by Toho Chemical Industry Co., Ltd.)"), and 56 parts by weight of ion exchange water as a liquid matter are mixed, and the resultant product is dispersed for 1 hour using a rocking mill with zirconia beads (φ 1 mm), whereby a pigment dispersion is prepared.

Next, 2 parts by weight of a surfactant (dispersant "Solsperse 71000 (manufactured by Lubrizol Corp.)) and 20 parts by weight of the prepared pigment dispersion are added to 75 parts by weight of an ultraviolet ray-curable monomer "VEER-AI (manufactured by Nippon Shokubai Co., Ltd.), 2-(2-(vinyloxyethoxy)ethyl acrylate) as a radiation-curable compound, and the resultant product is dispersed for 0.5 hours using a homogenizer. Then, 3 parts by weight of a photopolymerization initiator Irgacure 819 is dissolved in the obtained dispersion, whereby an ink is prepared.

Moreover, when observing the ink, it is confirmed that the droplets of the liquid matter (water) are dispersed in the ink. In addition, when observing by the method described above, it is confirmed that the solid particulate matter (melamine-formaldehyde condensation resin particles) is present in the droplets of the liquid matter (water).

Example 3

40 parts by weight of titanium oxide particles "JR405 (manufactured by TAYCA), 0.21 μm" as a solid particulate matter, 4 parts by weight of a surfactant (dispersant "trade name: Phosphanol RS-610 (manufactured by Toho Chemical Industry Co., Ltd.)"), and 56 parts by weight of ion exchange water as a liquid matter are mixed, and the resultant product is dispersed for 1 hour using a rocking mill with zirconia beads (φ 1 mm), whereby a pigment dispersion is prepared.

Next, 2 parts by weight of a surfactant (dispersant "Solsperse 71000 (manufactured by Lubrizol Corp.)) and 20 parts by weight of the prepared pigment dispersion are added to 75 parts by weight of an ultraviolet ray-curable monomer "VEER-AI (manufactured by Nippon Shokubai Co., Ltd.), 2-(2-(vinyloxyethoxy)ethyl acrylate) as a radiation-curable compound, and the resultant product is dispersed for 0.5 hours using a homogenizer. Then, 3 parts by weight of a photopolymerization initiator Irgacure 819 is dissolved in the obtained dispersion, whereby an ink is prepared.

Moreover, when observing the ink, it is confirmed that the droplets of the liquid matter (water) are dispersed in the ink. In addition, when observing by the method described above, it is confirmed that the solid particulate matter (titanium oxide particles) is present in the droplets of the liquid matter (water).

Comparative Example 1

An ink is prepared in the same manner as in Example 1 except that 77 parts by weight of the ultraviolet ray-curable monomer is used and a surfactant is not added.

When visually observing the ink, in the ink, the droplets of the liquid matter (water) are formed immediately after dispersion, and the droplets are coalesced in a short period of time, and thus, evaluation of the coating film is not possible.

Comparative Example 2

8 parts by weight of melamine-formaldehyde condensation resin particles "product name: Epostar S (manufactured by Nippon Shokubai Co., Ltd.), D50v=0.21 μm" as a solid particulate matter and 2 parts by weight of a surfactant (product name: dispersant "Solsperse 71000 (manufactured by Lubrizol Corp.)") are added to 87 parts by weight of an ultraviolet ray-curable monomer "VEER-AI (manufactured by Nippon Shokubai Co., Ltd.), 2-(2-(vinyloxyethoxy)ethyl acrylate) as a radiation-curable compound, and the resultant product is dispersed for 0.5 hours using a homogenizer. Then, 3 parts by weight of a photopolymerization initiator Irgacure 819 is dissolved in the obtained dispersion, whereby an ink is prepared.

Comparative Example 3

8 parts by weight of titanium oxide particles "JR405 (manufactured by TAYCA), D50v=0.21 μm" as a solid particulate matter and 2 parts by weight of a surfactant (product name: dispersant "Solsperse 71000 (manufactured by Lubrizol Corp.)") are added to 87 parts by weight of an ultraviolet ray-curable monomer "VEER-AI (manufactured by Nippon Shokubai Co., Ltd.), 2-(2-(vinyloxyethoxy)ethyl acrylate) as a radiation-curable compound, and the resultant product is dispersed for 0.5 hours using a homogenizer. Then, 3 parts by weight of a photopolymerization initiator Irgacure 819 is dissolved in the obtained dispersion, whereby an ink is prepared.

Measurement and Evaluation

The following measurement and evaluation are performed on the ink prepared in each Example. The results are shown in Table 1.

Measurement of Volume Average Particle Size of Droplets of Liquid Matter in Ink

Measurement of the volume average particle diameter (D50v) of the droplets of the liquid matter in the ink is performed on the ink prepared in each Example by the method described above.

Dispersion Stability

The ink prepared in each Example is put into a 20 mL sample bottle and allowed to stand, and the non-uniformity of the density is observed, and evaluation is performed according to the following criteria.

Evaluation Criteria

A: Density is uniform even in aging over 3 month

B: Density becomes non-uniform in aging for 1 month

C: Density becomes non-uniform in aging for 2 weeks

D: Density becomes non-uniform in aging for 1 week

Whiteness

After the coating film of the ink prepared in each Example is formed on a transparent film, the coating film of the ink is irradiated with ultraviolet rays so as to be cured, whereby a white cured film having a thickness of 5 μm is formed. As the curing conditions by ultraviolet rays, a UV-LED is used, the irradiation wavelength is 365 nm, and the curing energy is 150 mJ.

The obtained white cured film is placed on a black paper together with the transparent film, and a CIE1976 (L*a*b*) color system of the white cured film is measured using X-Rite 939. The whiteness W is calculated from the measured values using the following equation.

$$W=100-((100-L^{*2})+a^{*2}+b^{*2})^{1/2} \quad \text{Equation}$$

Evaluation is performed according to the following evaluation criteria.

Evaluation Criteria

A: 60% or greater

B: 50% or greater and less than 60%

C: 40% or greater and less than 50%

D: Less than 40%

Concealing Properties

After the coating film of the ink prepared in each Example is formed on a transparent film, the coating film of the ink is irradiated with ultraviolet rays so as to be cured, whereby a white cured film having a thickness of 5 μm is formed. As the curing conditions by ultraviolet rays, a UV-LED is used, the irradiation wavelength is 365 nm, and the curing energy is 150 mJ.

The concealing ratio of the obtained white cured film is determined as follows.

The obtained white cured film is placed on a black paper for concealing ratio test together with the transparent film, then, a tristimulus value Y is measured using X-Rite 939, and the concealing ratio is calculated using the following equation.

$$\text{Concealing ratio}=Yb/Yw \text{ (}Yb\text{:tristimulus value } Y \text{ on a black paper, } Yw\text{:tristimulus value } Y \text{ on a white cured film)} \quad \text{Equation}$$

Evaluation is performed according to the following evaluation criteria.

Evaluation Criteria
A: Concealing ratio is 40% or greater
B: Concealing ratio is 30% or greater and less than 40%
C: Concealing ratio is 20% or greater and less than 30%
D: Concealing ratio is less than 20%

Details of each example, the evaluation results, and the like are shown in Table 1.

In Table 1, the content of the surfactant represents a content in the ink. The content of the liquid matter represents a content in the ink. The content of the solid particulate matter represents a content in the ink. In addition, the melamine resin particles represent "melamine-formaldehyde condensation resin particles".

TABLE 1

|  |  | Example 1 | Example 2 | Example 3 | Comparative Example 1 | Comparative Example 2 | Comparative Example 3 |
|---|---|---|---|---|---|---|---|
| Ink | Composition characteristics | Surfactant Droplets of liquid matter | Surfactant Droplets of liquid matter Melamine resin particles | Surfactant Droplets of liquid matter Titanium oxide particles | Droplets of liquid matter | Melamine resin particles | Titanium oxide particles |
|  | Content of surfactant (% by weight) | 2 | 2.8 | 2.8 | 0 | 2 | 2 |
|  | Content of liquid matter (% by weight) | 20 | 12 | 12 | 20 | 0 | 0 |
|  | Content of solid particulate matter (% by weight) | 0 | 11.2 | 11.2 | 0 | 8 | 8 |
|  | D50v of droplets of liquid matter (μm) | 0.28 | 0.26 | 0.30 | Evaluation is impossible | — | — |
|  | White cured film (configuration characteristics) | Voids | Voids Resin particles | Voids Titanium oxide particles | Voids | Resin particles | Titanium oxide particles |
|  | Dispersion stability | A | A | B | D (droplets are combined) | B | D |
|  | Whiteness | C | B | A | Evaluation is impossible | C | A |
|  | Concealing properties | B | B | A | Evaluation is impossible | D | A |

From the results described above, it is found that, in Example 1, the dispersion stability of the ink is high, and a white cured film having high concealing properties and whiteness is obtained, compared to Comparative Example 1.

In addition, it is found that, with the each ink in Examples 2 and 3 including the solid particulate matter, a white cured film having high concealing properties and whiteness is obtained, compared to that in Example 1 not including particles (particulate matter). Furthermore, it is found that, in Examples 2 and 3, the dispersion stability of the ink is high, and a white cured film having high concealing properties and whiteness is obtained, compared to Comparative Examples 2 and 3.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An ink, comprising:
a radiation-curable compound;
a liquid matter which is incompatible with the radiation-curable compound and is dispersed in a state of droplets;
a solid particulate matter that is present in the droplets formed of the liquid matter; and
a surfactant, wherein
a content of the liquid matter is from 10% by weight to 50% by weight with respect to the total weight of the ink,
the solid particulate matter is a white solid particle, and
the volume average particle diameter of the droplets ranges from 0,1 μm to 1 μm.

2. The ink according to claim 1,
wherein the solid particulate matter is titanium oxide particles.

3. The ink according to claim 1,
wherein a content of the solid particulate matter is from 1% by weight to 70% by weight with respect to the total weight of the ink.

4. The ink according to claim 2,
wherein a content of the solid particulate matter is from 1% by weight to 70% by weight with respect to the total weight of the ink.

5. The ink according to claim 1,
wherein a content of the radiation-curable compound is from 50% by weight to 99% by weight with respect to the total weight of the ink.

6. The ink according to claim 1,
wherein a content of the surfactant is from 0.1% by weight to 50% by weight with respect to the total weight of the ink.

7. An ink cartridge that comprises the ink according claim 1.

8. An ink discharge apparatus, comprising:
a discharge unit that comprises the ink according to claim 1 and discharges the ink; and
a radiation irradiation unit which irradiates the discharged ink with radiation to thereby cure the ink.

9. An ink discharge method, comprising:
discharging the ink according to claim 1; and
curing the discharged ink by irradiation with radiation.

10. A substrate coated with the composition of claim 1.

* * * * *